(No Model.)
M. W. DEWEY.
APPARATUS FOR ELECTRIC SOLDERING AND CEMENTING CANS.
No. 443,749. Patented Dec. 30, 1890.
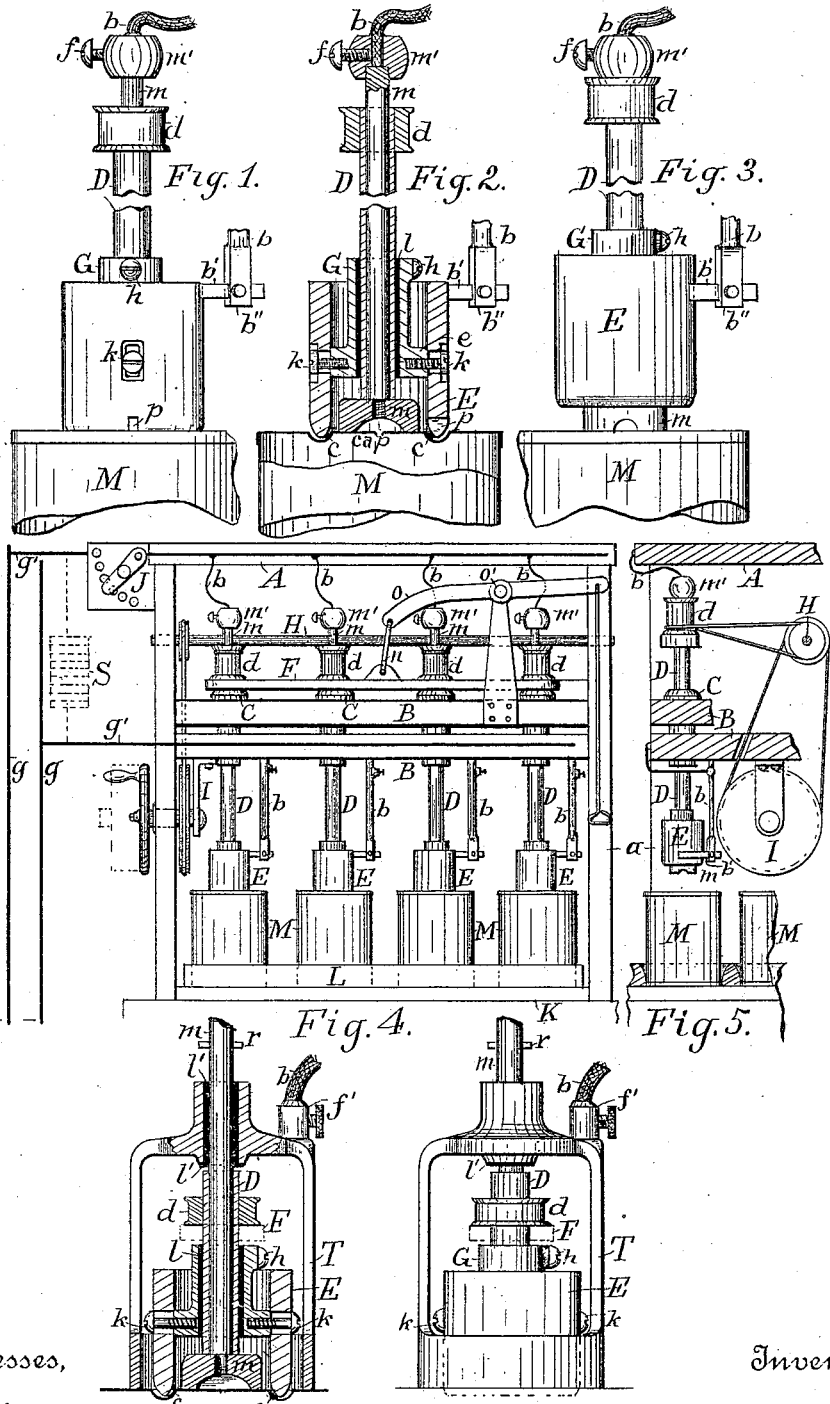
Witnesses,
J. J. Laass.
C. L. Bendixon
Inventor,
Mark W. Dewey,
By his Attorneys,
Duell, Laass, & Duell.
THE NORRIS PETERS CO., PHOTO-LITHO., WASHINGTON, D. C.

UNITED STATES PATENT OFFICE.

MARK W. DEWEY, OF SYRACUSE, NEW YORK, ASSIGNOR TO THE DEWEY CORPORATION, OF SAME PLACE.

APPARATUS FOR ELECTRIC SOLDERING AND CEMENTING CANS.

SPECIFICATION forming part of Letters Patent No. 443,749, dated December 30, 1890.

Application filed October 4, 1890. Serial No. 367,129. (No model.)

*To all whom it may concern:*

Be it known that I, MARK W. DEWEY, of Syracuse, in the county of Onondaga, in the State of New York, have invented new and useful Improvements in Apparatus for Electric Soldering and Cementing Cans, (Case No. 78,) of which the following, taken in connection with the accompanying drawings, is a full, clear, and exact description.

My invention relates to apparatus for employment in those methods or processes of uniting the parts of sheet-metal ware, more particularly cans, which require the employment of heat to melt or soften the uniting material, and afterward the withdrawal of the heat to cool and set said material.

The object of my invention is to employ electricity as the heating agent for the solder or cement applied to the junction of the pieces and for the junction, so that they may be heated easily to the required temperature, and when a series of articles are soldered simultaneously so that all will be heated uniformly, which cannot be accomplished by gas or other heating mediums now employed for this purpose.

The object of my invention also is to heat electrically or by an electric current the solder and junctions of caps and cans in such a manner that the general construction of capping-machines now in use will not be required to be changed very materially, as the present construction of the said machines is highly satisfactory and desirable. Said machines contain revolving cylindrical soldering-irons that are vertically movable, and presser-irons that are also vertically movable but independent of the soldering-irons, so that pressure can be maintained upon the caps of the cans for a certain length of time after the soldering-irons have been removed to permit the solder to cool and the caps to be firmly joined to the cans.

The object of my invention further is to electrically heat the solder and junction without making a heating-conductor of the soldering-iron itself, as it is of low resistance and would require an enormous amount of current to heat it, and also large gage and expensive conductors to lead the current to it.

In my process the current is passed through the junction of the parts of the article between suitable electric contacts—as, for instance, when capping cans the current is passed from the presser-iron bearing upon the cap through the junction between the cap and the top of the can to the soldering-iron in contact with the solder or the can.

It has heretofore been proposed to soften the solder, when soldering lids on cans, by passing a heating electric current through a stationary pressure-iron and permitting the solder to cool by cutting off the current before the pressure of the said iron was removed. This plan will not do for capping purposes, as it not only requires a change in the construction of the present capping-machines, but is very inefficient, as there is no revolving iron provided to distribute and sweat the solder in the depression at the joint around the cap, and no unheated pressure-iron to maintain pressure upon the cap while the heated iron is removed. The above plan would also occupy too much time, for the reason that the pressure-iron must remain on the cap after the current through it is cut off, a sufficient time to lose by conduction a great part of the heat accumulated in it to permit the solder to cool and set before the pressure upon the cap is removed, and if said iron is cooled to this point it will require a strong current or a long flow of current, and consequently a loss of time and energy, to again raise the temperature of the irons for the next set of cans to be soldered or capped, as the pressure-iron is of large gage.

With my invention it will be observed that not much time will be lost in heating and cooling the solder and junction, as the junction of the pieces make a good heating-conductor, which is rapidly cooled upon raising the soldering-iron or one of the electric contacts and interrupting the current through the junction, the pressure being maintained upon the pieces after the removal of the soldering-iron by the remaining electric contact or the independent pressure-iron.

To this end my invention consists in the combination of terminals of an electric circuit to be applied to the work and a movable tool for distributing or sweating in the solder or cement at the junction.

My invention consists, also, in a pressure-instrument to be applied to the cap and connected to one terminal of an electric circuit, a rotatable soldering-tool connected to the other terminal of the circuit, and means for removing the soldering-tool from the work before the pressure-instrument is removed.

My invention consists, further, in means for electrically heating the pieces at the junction, a movable iron or tool to make contact with the solder at the junction and to move while in contact with the same, and means for applying pressure to press the pieces together.

My invention consists in certain other combinations of devices useful in practicing the method, all as hereinafter described, and specifically set forth in the claims.

In the accompanying drawings, Figure 1 is an elevation of my improved can-capping apparatus as applied to a single can. Fig. 2 is a sectional view of the same. Fig. 3 is an elevation showing the soldering-tool raised. Fig. 4 is a front view of a machine. Fig. 5 is a sectional side elevation of the same. Fig. 6 is a sectional view of a modification of the apparatus shown in Figs. 1, 2, and 3, and Fig. 7 is an elevation of the same.

Referring specifically to the first five figures in the drawings, A is the frame-work of the machine, which may be of any suitable form or construction.

$a$ $a$ are side vertical posts, (shown in Figs. 4 and 5,) to which are secured the bars or plates B, supporting the shaft-bearings C C, which fit therein. The bearings C hold the vertical shafts or tubes D D of the soldering-irons or electric contacts E. It will be obvious that the bearings C and their supports may be constructed so that the irons may be separated more or less, as is sometimes done in such machines, to admit cans of different diameters.

The tubes D are provided with pulleys $d$ at their upper ends. Between the pulleys and the upper parts of the bearings C is a perforated or slotted bar F, which is adapted to be raised. At the lower end of each tube is a sleeve G, having a flange or collar $e$. The sleeve G is held to the tube by means of a set-screw $h$, but is insulated from the tube by insulation $l$. The collar $e$ is of the same diameter as the interior of the cylindrical soldering-iron and rests therein, the connection between the two parts being effected by means of the set-screws $k$, which pass through slots cut in the body of the soldering-iron. A presser-rod $m$, having a weight $m'$ at its upper end, passes through the center of each tube D, the lower end of the rod being adapted to rest upon the top of the can-cap. At the center of the bar F is a link $n$, connected with a lever $o$, having a fulcrum at $o'$, which lever, when depressed, causes the entire series of soldering-irons to be raised. A line of shafting H is arranged in suitable relation to the soldering devices and provided with pulleys and belts for driving the same. Motion is given to the shafting H by means of a belt leading from the wheel I, which may be rotated by any suitable power or means.

K is a sliding table, on which a tray L may be placed. The cam M may be placed on the tray or directly on the sliding table. The presser-iron $m$ is connected at the top with one terminal $b$ of an electric circuit by a binding-screw $f$, and the soldering-iron E is connected with the other terminal $b$ of the circuit through a spring or brush $b'$, held at one end in a stationary support $b''$ and bearing with its free end upon the said iron. Any suitable source of electricity may be employed.

$g$ $g$ indicate leads from some source, and $g'$ is a circuit connected with the said leads. The circuit contains a current-regulator or adjustable resistance J, and one of its leads extends along the upper part of the frame, while the other lead extends along the lower bar B. The junctions of articles are shown connected in the circuit in parallel; but it will be obvious that they may be connected in circuit in series or otherwise, as desired, which will depend upon the strength of current available, the resistance of the heating-conductors or junction $c$, and the amount of heat required.

The operation of the machine is as follows: The soldering-irons having been placed the proper distances apart to suit the diameter of the cans to be capped, the soldering-irons are put in motion or caused to revolve. A series of filled cans bearing loose caps and pieces or rings of solder are then prepared for the action of the machine, being either placed directly on the sliding table or in the tray. The lever $e$ is then depressed, whereupon the entire series of soldering-irons and pressure-rods are raised sufficiently to allow the cans to go under. The cans being put in position, the soldering-irons and presser-rods are allowed to descend, the latter holding the caps steadily in place. The electric circuit having been closed properly through the current-regulator J, the current will immediately flow when the soldering-irons are lowered to come in contact with the solder at the junction, and the junction will be rapidly heated and the solder melted thereat. The circuit may not be closed through the current-regulator until after the soldering-irons have been lowered upon the solder, if desired; but the former plan is preferred, as then more rapid operations are performed. The edges of the soldering-irons will be heated by conduction from the heated joints, but are not the electric heating-conductors, but simply electric contacts for conveying the current to the heating-conductors or the edges of the caps and tops of the cans in contact with each other and the solder. About two or three revolutions of the soldering-irons have been found sufficient to complete the operation. The caps having been soldered on, the soldering-irons are first lifted, thus interrupting the current through the junction, the presser-rods remaining upon the caps for a time until the solder has cooled enough to firmly unite the pieces. Then the presser-rods are raised and the cans slid from under and a second series made ready.

The operating-edge of the soldering-iron is provided with slots $p$, the object being to prevent or obviate the presence of a completely circular edge, which has been found objectionable.

The soldering-iron may be of copper, steel, or any other metal best adapted for the purpose.

It will be obvious that any suitable and well-known forms of aciding devices, solder or cement applying devices, or cooling devices may be employed with my invention and may be connected to and operated with my apparatus designed for practicing my process. It will be also obvious that any suitable and well-known forms of devices for feeding and withdrawing the article, as the cans and caps, to and from the machine may be employed with my invention.

In Figs. 1 and 2 both the presser-iron and the soldering-iron are shown lowered in contact with the work. In Fig. 3 the soldering-iron is shown raised from the joint, while the presser-rod is in contact with the cap; but in Fig. 5 both of said irons are shown raised from the can. The contact-irons on the lower extremity of the presser-irons are made large to make good contact with the caps, so that they will not be greatly heated. The bifurcation or hollow in the contact-iron is made in order that the vent usually produced in the cap upon which the iron rests may be uncovered during the process of soldering.

It will be understood, of course, that rotary apparatuses may be employed to practice my method as well as the apparatus shown.

The soldering-irons may not be continuously revolved, but only when lowered upon the solder or can.

It will be obvious that my apparatus may be also used for soldering together any of the parts of a can or similar article without departing from my invention. Further than this, I would have it understood that if the can is made to rotate or revolve under the soldering-iron while the latter is held stationary it will be equivalent to rotating the iron while the can is stationary.

The source of electricity may be a storage-battery, as shown in dotted lines at S in Fig. 4 of the drawings.

Referring to Figs. 6 and 7 of the drawings, it will be noticed that the soldering-iron E is not an electric contact, but that a bell-shaped frame T, surrounding the said iron and sleeved upon the presser-rod $m$ above the pulley $d$, is the electric contact. This contact T is moved vertically with the presser-rod, is insulated from the rod by insulation $l'$, and is provided with a binding-post $f'$, which holds the terminal $b$ of the circuit. The said contact is movable vertically on the rod. The contact T does not rotate, and is adapted to rest upon the head of the can just outside of the circular depression in which the solder is distributed. This contact and also the other contact on the presser-iron may be made of either copper or iron. In this case when the soldering-iron is raised by the bar F the end of the tube D comes in contact with the frame T or the insulation $l'$ thereon and the contact T is raised with it. When the said frame reaches the pin or stop $r$ on the rod $m$, the presser-rod is also raised, for the purpose hereinbefore described. In the first-described apparatus the presser-rod is lifted when the tube or pulley comes in contact with the weight $m'$.

The method or process herein set forth is not claimed, as that forms the subject of another application, filed by me on the same date as the present application, Serial No. 367,128.

What I claim as my invention, and desire to secure by Letters Patent, is—

1. In an electric soldering or cementing apparatus for cans, terminals of an electric circuit to be applied to the work, and a movable tool for distributing or sweating in the solder or cement at the junction.

2. In an electric soldering or cementing apparatus for cans, terminals of an electric circuit to make contact with the work, a movable tool for distributing or sweating in the solder or cement at the junction, and means for pressing the pieces together and maintaining the pressure after the removal of one of the terminals.

3. In an apparatus for electrically soldering the caps on cans, a pressure-instrument to be applied to the cap and connected to one terminal of an electric circuit, a rotatable soldering-tool connected to the other terminal of the circuit, and means for removing the soldering-tool from the work before the pressure-instrument is removed, as and for the purpose described.

4. In an apparatus for electrically soldering the caps on cans, a suitable source of electricity, a series of pressure-instruments to press the caps upon the cans and connected to one terminal of said source, a series of rotatable soldering-tools connected to the other terminal of the source and adapted to be brought simultaneously to the joints, and means for removing the said soldering-tools simultaneously from the work before the pressure-instruments are removed, as and for the purpose described.

5. In an apparatus for electrically soldering the caps on cans, means for electrically heating the pieces at the junction, and a rotatable iron or tool to make contact with the solder.

6. In an apparatus for electrically soldering the caps on cans, means for electrically heating the pieces at the junction, a movable iron or tool to make contact with the solder at the junction and to move while in contact with the same, and means for applying pressure to press the pieces together when the said iron or tool is removed.

7. In an apparatus for electrically soldering the caps on cans, means for electrically heating the pieces at the junction, a movable iron or tool to make contact with the solder at the junction and to move while in contact with the same, and means for applying pressure to press the pieces together.

8. In an apparatus for electrically soldering the caps on cans, a pressure-instrument to be applied to the cap and connected to one terminal of an electric circuit, a rotatable soldering-tool connected to the other terminal of the circuit and mounted loosely upon the shaft of the pressure-instrument, insulation for separating the latter from the soldering-tool, and means for removing the soldering-tool from the work before the pressure-instrument is removed, as and for the purpose described.

In testimony whereof I have hereunto signed my name this 23d day of September, 1890.

MARK W. DEWEY. [L. S.]

Witnesses:
 C. H. DUELL,
 J. J. LAASS.